(12) United States Patent
Ruiz

(10) Patent No.: US 6,997,149 B1
(45) Date of Patent: Feb. 14, 2006

(54) SPARK TIMING CONTROL AND METHOD

(75) Inventor: Victoriano Ruiz, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/093,608

(22) Filed: Mar. 30, 2005

(51) Int. Cl.
  *F01L 1/34* (2006.01)
(52) U.S. Cl. ............... 123/90.15; 123/90.16; 123/90.17
(58) Field of Classification Search ............ 123/90.15, 123/90.16, 90.17, 90.18, 90.31
  See application file for complete search history.

(56) References Cited

U.S. PATENT DOCUMENTS 5,590,632 A * 1/1997 Kato et al. .............. 123/480

* cited by examiner

*Primary Examiner*—Thomas Denion
*Assistant Examiner*—Zelalem Eshete
(74) *Attorney, Agent, or Firm*—Christopher DeVries

(57) ABSTRACT

A spark control system and method for an engine having an intake cam phaser and/or an exhaust cam phaser, and having engine sensors, comprises a principal calculation module that determines a principal spark advance value based upon actual rotational position of the cam phasers, and an output calculation module that determines an output spark advance value based upon the principal spark advance value and spark modifiers determined from the engine sensors. The actual rotational positions of the cam phasers are obtained from predictive calculations or rotational position sensors on the cam phasers. The principal calculation module includes two separately calibrated look-up tables, indexed by the actual rotational position of the cam phasers, whose outputs are scaled and combined to determine the principal spark advance. The spark modifiers include temperature base, coolant, induction air temperature, equivalence ratio, and piston slap.

18 Claims, 4 Drawing Sheets

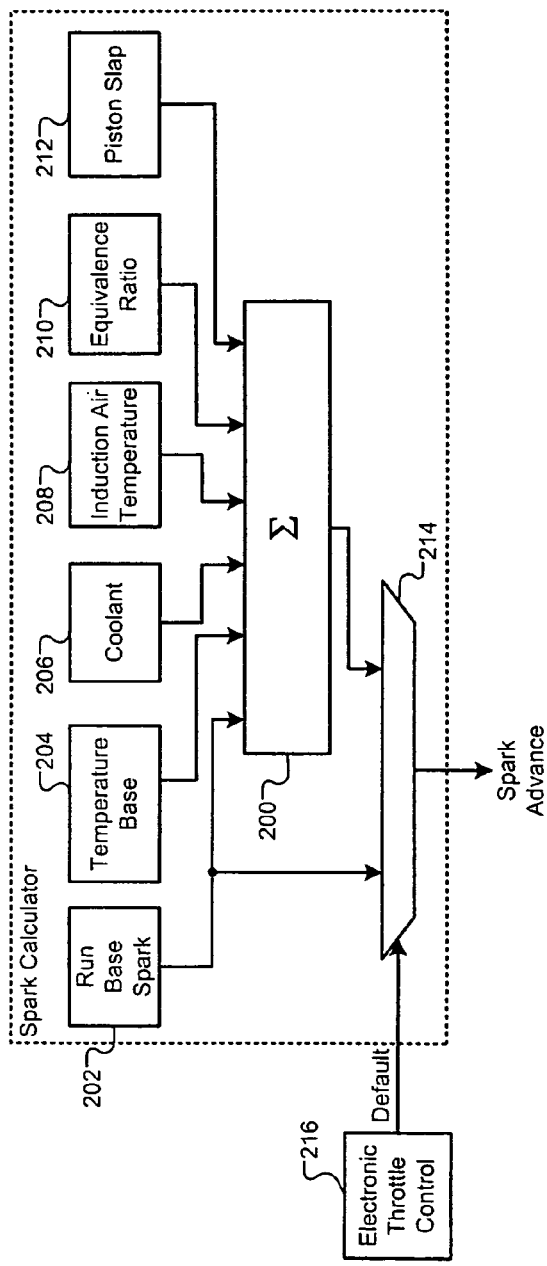
FIG. 3
FIG. 4B
FIG. 4A

SPARK TIMING CONTROL AND METHOD

FIELD OF THE INVENTION

The present invention relates to spark timing control in an internal combustion engine.

BACKGROUND OF THE INVENTION

Referring now to FIG. 1, a block diagram of an engine 100 according to the prior art is presented. Air is drawn through a throttle body 102 into an intake manifold 104. A representative cylinder 106 includes an intake valve 108 and an exhaust valve 110. The intake valve 108 allows an air-fuel mixture to be drawn into the cylinder 106. The intake valve 108 is controlled by an intake camshaft 112, while the exhaust valve 110 is controlled by an exhaust camshaft 114. The intake valve 108 opens and closes as the intake camshaft 112 rotates. Likewise, the exhaust valve 110 opens and closes as the exhaust camshaft 114 rotates.

Traditionally, the intake and exhaust camshafts, 112 and 114, have been driven directly by the crankshaft (not shown) via a belt or chain. The rotational position of the camshafts, 112 and 114, determines the times, with respect to crankshaft position that the intake and exhaust valves, 108 and 110, open. At a certain time, an ignition coil 116 provides a high voltage to a spark plug 118 that ignites the air-fuel mixture within the representative cylinder 106. When the exhaust valve 110 opens, combustion products are output to an exhaust system 120.

To give the engine designer more flexibility, cam phasers have been devised. An intake cam phaser 122 can change the rotational position of the intake camshaft 112 with respect to the crankshaft. Likewise, an exhaust cam phaser 124 can change the rotational position of the exhaust camshaft 114 with respect to the crankshaft. When the intake and exhaust cam phasers 122, and 124, are actuated, spark calculations are updated to incorporate the new target position of the cam phasers.

SUMMARY OF THE INVENTION

A spark control system for an engine having an intake cam phaser and/or an exhaust cam phaser and having at least one engine sensor comprises a principal calculation module that determines a principal spark advance value based upon actual rotational position of the cam phasers and an output calculation module that determines an output spark advance value based upon the principal spark advance value and data from the at least one engine sensor. The actual rotational position of the cam phasers is obtained from predictive calculations or rotational position sensors on the cam phasers.

In other features, the principal calculation module includes a look-up table to determine the principal spark advance, indexed by the actual rotational position of the cam phasers. In still other features, an output of a second look-up table, calibrated for low octane fuel, is scaled and combined with the output of the first look-up table. The scaling is biased between zero and one based upon knock intensity.

In still other features, the principal calculation module combines the principal spark advance value with at least one spark modifier when a failure signal is not being received from an electronic throttle control system. Spark modifiers include temperature base, coolant, induction air temperature, equivalence ratio, and piston slap.

A method of determining spark timing for an engine having an intake cam phaser and/or an exhaust cam phaser, and having at least one engine sensor, comprises calculating a principal spark advance value based upon actual rotational position of the cam phasers, and calculating an output spark advance value based upon the principal spark advance value and data from the at least one engine sensor. In other features, the actual rotational position is obtained by analyzing information from at least one rotational position sensor on the cam phasers or by performing predictive calculations.

In still other features, the principal spark advance is determined from an output of a first look-up table that is indexed by the actual rotational position of the cam phasers. The output of the first look-up table can be modified by a scaled output of a second look-up table that is indexed by the actual rotational position of the cam phasers. In a further feature, the principal spark advance value is combined with at least one spark modifier.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a block diagram of an exemplary spark calculation algorithm for the control module of FIG. 2;

FIG. 4A is a block diagram depicting an exemplary calculation of the temperature base modifier;

FIG. 4B is a block diagram depicting an exemplary calculation of the coolant modifier;

DETAILED DESCRIPTION OF THE PREFERRED EMBODIMENTS

Figure 1:
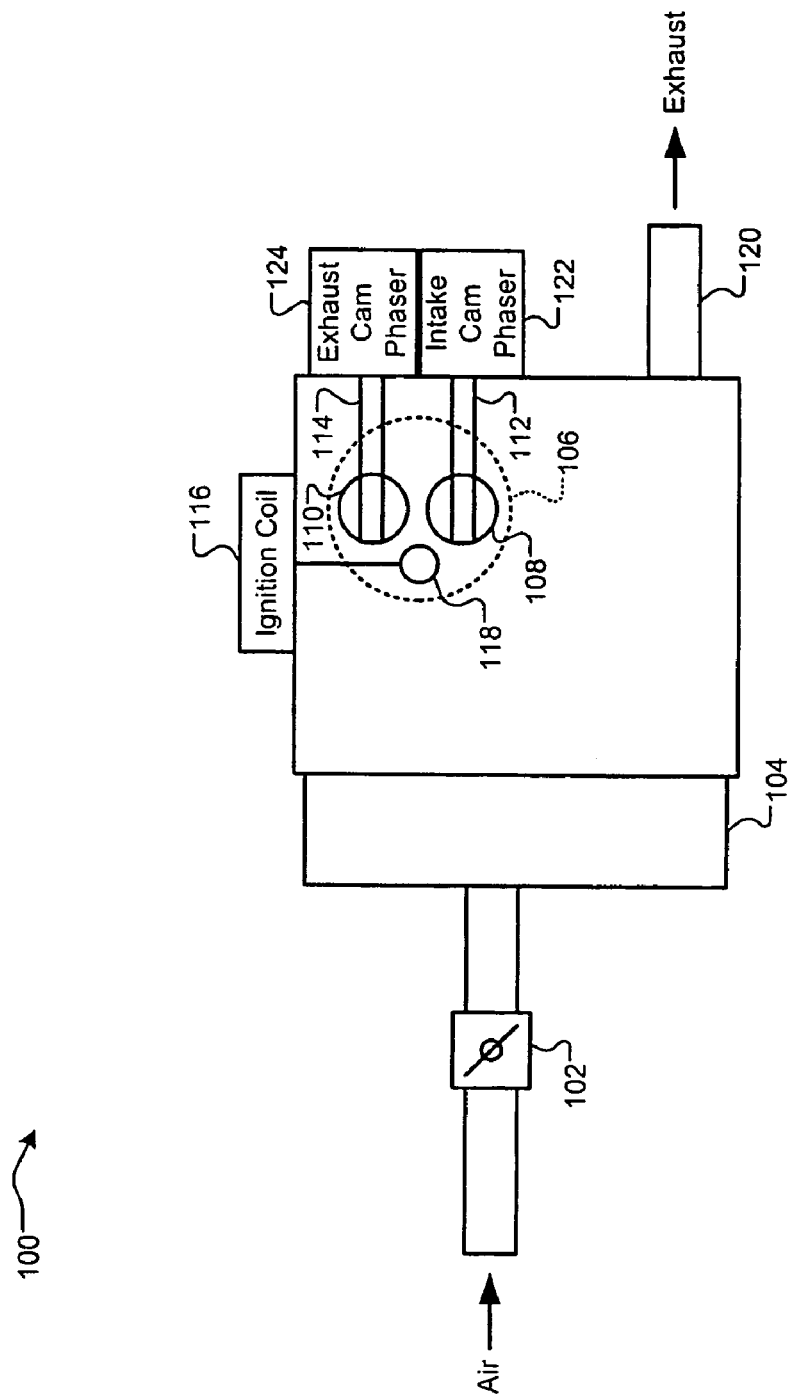
FIG. 1 is a block diagram of an engine according to the prior art.

The following description of the preferred embodiments is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 2:
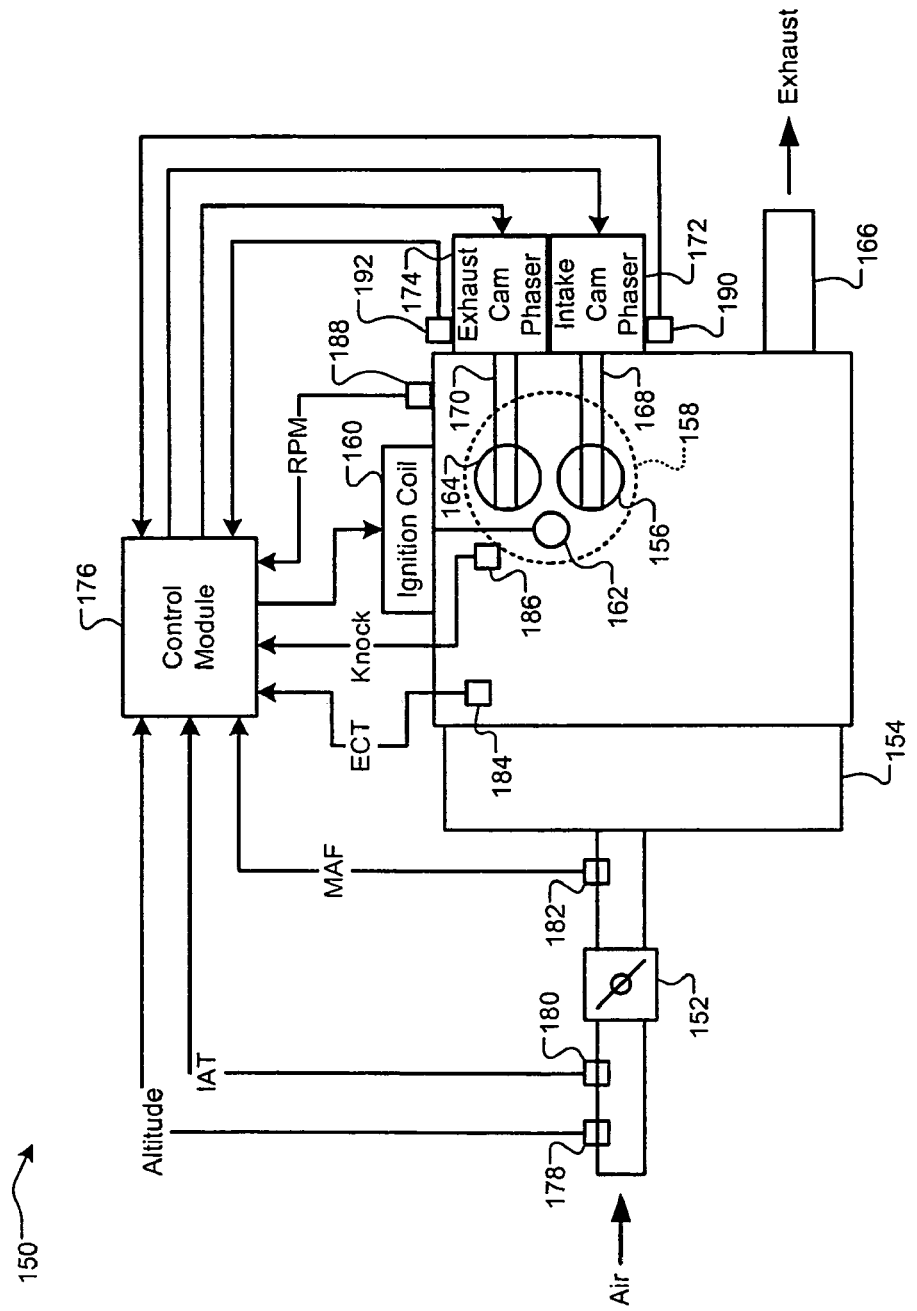
FIG. 2 is a block diagram of an engine with an exemplary control system according to the principles of the present invention.

Referring now to FIG. 2, a block diagram of an engine 150 with an exemplary control system according to the principles of the present invention is presented. Air is drawn through a throttle valve 152 into an intake manifold 154. Air-fuel mixture is drawn through an open intake valve 156 into a representative cylinder 158. An ignition coil 160 activates a spark plug 162 to ignite the air-fuel mixture within the cylinder 158. After ignition, an open exhaust valve 164 allows the cylinder 158 to vent the products of combustion to an exhaust system 166. The intake and exhaust valves, 156 and 164, are controlled by an intake camshaft 168 and an exhaust camshaft 170, respectively. The rotational position of the intake camshaft 168 is adjusted with respect to a crankshaft (not shown) by an intake cam phaser 172. Likewise, rotational position of the exhaust camshaft 170 is adjusted with respect to the crankshaft by an exhaust cam phaser 174.

A control module 176 receives altitude information from an altitude sensor 178, induction air temperature information from a temperature sensor 180 prior to air reaching the throttle valve 152, load information from a mass air flow sensor 182, engine coolant temperature information from a temperature sensor 184, knock intensity information from a knock sensor 186, engine speed information from an RPM sensor 188, intake cam phaser position information from a first rotational sensor 190 connected to the intake cam phaser 172, and exhaust cam phaser position information from a second rotational sensor 192 connected to the exhaust cam phaser 174.

The control module 176 sends a control signal to the ignition coil 160 to determine the firing time of the spark plug 162. The control module also controls the position targets of the intake cam phaser 172 and the exhaust cam phaser 174. One skilled in the art will recognize that the control module 176 receives many different inputs and generates many more outputs in any given engine configuration. In addition, one skilled in the art will recognize that a variety of different sensors can provide the necessary information to the control module 176.

Spark advance is accomplished very quickly—that is, by the next spark event of the engine. When intake and exhaust cam phasers are directed to move, however, they are relatively slow to reach the target position. This can cause the engine to be over-sparked during these transitions. An algorithm according to the present invention prevents this by making spark advance a function of the actual positions of the cam phasers instead of target positions.

Referring now to FIG. 3, a block diagram of an exemplary spark calculation algorithm for the control module 176 of FIG. 2 is presented. A summation module 200 combines a dominant run base spark 202 with a number of modifiers. These modifiers include temperature base 204, coolant 206, induction air temperature 208, equivalence ratio 210, and piston slap 212. A multiplexer 214 selects either an output from the summation module 200 or the run base spark 202, based upon a signal from an electronic throttle control module 216. If the electronic throttle control module 216 detects a failure, a default signal is communicated to the multiplexer 214, causing the multiplexer 214 to choose the run base spark 202. This removes as many variables as possible in the event of a failure. An output of the multiplexer 214 is output as spark advance.

Referring now to FIG. 4A, a block diagram depicts an exemplary calculation of the temperature base modifier 204. A temperature table 218 selects a spark modifier value based upon engine coolant temperature. The selected value is output as the temperature base modifier 204.

Referring now to FIG. 4B, a block diagram depicts an exemplary calculation of the coolant modifier 206. A two-dimensional temperature table 220 selects a spark modifier value based upon engine coolant temperature and engine load (air mass measured in grams per cylinder). The selected value is output as the coolant modifier 206.

Figure 4D:
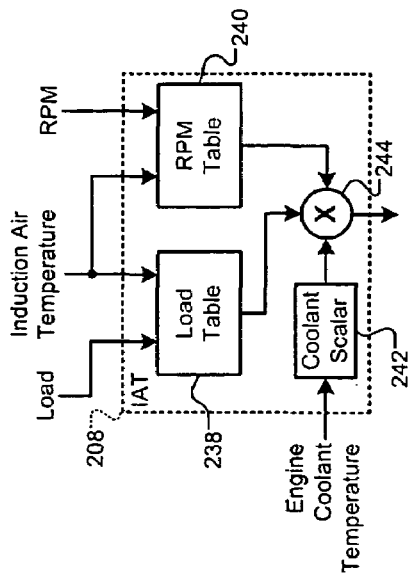
FIG. 4D is a block diagram depicting an exemplary calculation of the induction air temperature spark modifier.
Figure 4C:
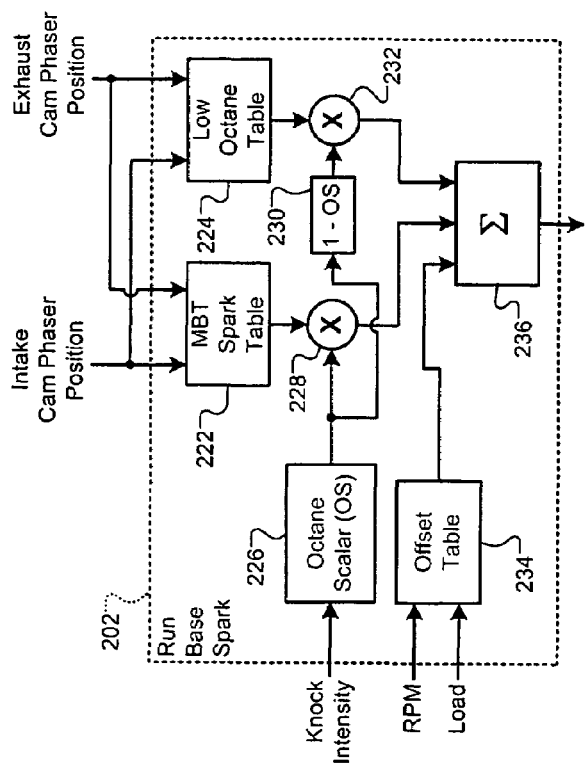
FIG. 4C is a block diagram depicting an exemplary calculation of the run base spark.

Referring now to FIG. 4C, a block diagram depicts an exemplary calculation of the run base spark 202. A two-dimensional MBT (Mean Best Torque) spark table 222 selects a spark advance value based upon actual intake cam phaser position and actual exhaust cam phaser position. A low octane table 224 also selects a spark advance value based upon intake and exhaust cam phaser positions. Preferably, the low octane table 224 is calibrated for low octane fuel, while the MBT spark table 222 is calibrated for higher octane fuel. An octane scalar module 226 determines an octane scalar value based upon knock intensity. The octane scalar module 226 increases the scalar toward a value of one as knock is detected. When no knock is detected, the scalar decreases toward a value of zero.

A first multiplier 228 multiplies the octane scalar value from the octane scalar module 226 with the spark advance value selected from the MBT spark table 222. A difference module 230 subtracts the octane scalar from the numeral one. A second multiplier 232 multiplies the output of the difference module 230 with the spark advance value selected from the low octane table 224. An offset table 234 generates a spark modifier based upon engine RPM (revolutions per minute) and engine load. Output of the first multiplier 228, the second multiplier 232, and the offset table 234 are combined in a summation module 236. An output of the summation module 236 is the run base spark 202.

Referring now to FIG. 4D, a block diagram depicts an exemplary calculation of the induction air temperature spark modifier 208. A two-dimensional load table 238 selects a scalar based upon induction air temperature and engine load. A two-dimensional RPM table 240 selects a scalar based upon induction air temperature and engine RPM. A coolant scalar table 242 selects a coolant scalar based upon engine coolant temperature. A multiplication module 244 multiplies the scalars from the load table 238, the RPM table 240, and the coolant scalar table 242. An output of the multiplication module 244 is the induction air temperature spark modifier 208.

Figure 4F:
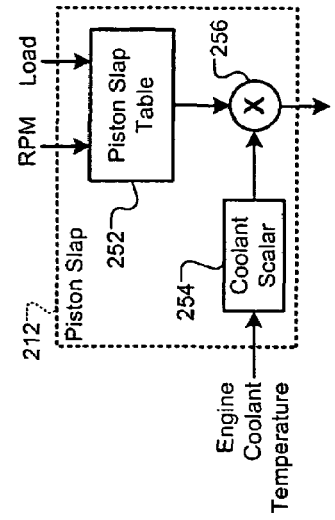
FIG. 4F is a block diagram depicting an exemplary calculation of the piston slap spark modifier.
Figure 4E:
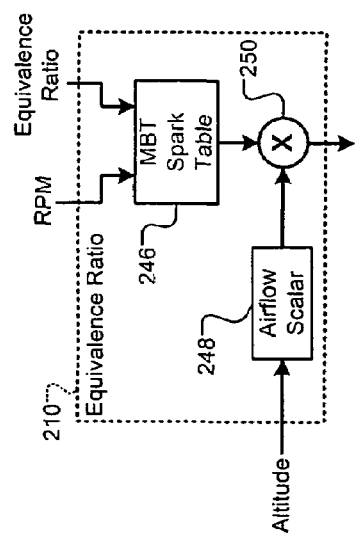
FIG. 4E is a block diagram depicting an exemplary calculation of the equivalence ratio spark modifier.

Referring now to FIG. 4E, a block diagram depicts an exemplary calculation of the equivalence ratio spark modifier 210. A two-dimensional MBT spark table 246 selects a value based upon engine RPM and equivalence ratio. Equivalence ratio is inversely related to air-fuel ratio and is used to accommodate alcohol fuel blends. An airflow scalar table 248 selects a value based upon altitude of the vehicle. A multiplication module 250 multiplies the outputs of the MBT spark table 246 and the air flow scalar table 248. An output of the multiplication module 250 is the equivalence ratio spark modifier 210.

Referring now to FIG. 4F, a block diagram depicts an exemplary calculation of the piston slap spark modifier 212. Piston slap spark retard reduces piston slap noise that generally occurs at cold engine coolant temperatures. A piston slap table 252 selects a value based upon engine RPM and engine load. A coolant scalar table 254 selects a value based upon engine coolant temperature. A multiplication module 256 multiplies the values output by the piston slap table 252 and the coolant scalar table 254. An output of the multiplication module 256 is the piston slap spark modifier 212.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A spark control system for an engine having at least one of an intake cam phaser and an exhaust cam phaser, and having at least one engine sensor, comprising:
   a principal calculation module that determines a principal spark advance value based upon actual rotational position of the at least one of an intake cam phaser and an exhaust cam phaser, wherein said principal calculation module includes an n-dimensional first look-up table to determine said principal spark advance, said first look-up table is indexed by said actual rotational position of the at least one of an intake cam phaser and an exhaust cam phaser, and n equals two when both intake and exhaust cam phasers are present, and n equals one otherwise; and
   an output calculation module that determines an output spark advance value based upon said Principal spark advance value and data from the at least one engine sensor.

2. The spark control system of claim 1 wherein said actual rotational position of the at least one of an intake cam phaser and an exhaust cam phaser is obtained from at least one rotational position sensor on each of the at least one of an intake cam phaser and an exhaust cam phaser.

3. The spark control system of claim 1 wherein said actual rotational position of the at least one of an intake cam phaser and an exhaust cam phaser is obtained from predictive calculations.

4. The spark control system of claim 1 wherein said principal calculation module further includes an n-dimensional second look-up table to determine said principal spark advance, said second look-up table is indexed by said actual rotational position of the at least one of an intake cam phaser and an exhaust cam phaser, and n equals two when both intake and exhaust cam phasers are present, and n equals one otherwise.

5. The spark control system of claim 4 wherein said second look-up table is calibrated using low-octane fuel.

6. The spark control system of claim 4 wherein scaled outputs of said first and second look-up tables are combined to produce said principal spark advance value.

7. The spark control system of claim 6 wherein said output of said first look-up table is scaled by an octane scalar and said output of said second look-up table is scaled by one minus said octane scalar before being combined to produce said principal spark advance value.

8. The spark control system of claim 7 wherein said octane scalar varies between zero and one, and increases with higher knock intensity and decreases with lower knock intensity, and the at least one engine sensor comprises a knock sensor.

9. The spark control system of claim 1 wherein said principal spark advance value includes a scalar offset selected from a two-dimensional table indexed by engine speed and engine load.

10. The spark control system of claim 1 wherein said principal calculation module selectively combines said principal spark advance value with at least one spark modifier.

11. A spark control system for an engine having at least one of an intake cam phaser and an exhaust cam phaser, and having at least one engine sensor, comprising:
    a principal calculation module that determines a principal spark advance value based upon actual rotational position of the at least one of an intake cam phaser and an exhaust cam phaser, wherein said principal calculation module combines said principal spark advance value with at least one spark modifier only when a failure signal is not being received from an electronic throttle control system; and
    an output calculation module that determines an output spark advance value based upon said principal spark advance value and data from the at least one engine sensor.

12. The spark control system of claim 10 wherein said at least one spark modifier includes at least one of temperature base, coolant, induction air temperature, equivalence ratio, and piston slap.

13. A method of determining spark timing for an engine having at least one of an intake cam phaser and an exhaust cam phaser, and having at least one engine sensor, comprising:
    determining a principal spark advance from an output of a first look-up table that is indexed by an actual rotational position of the at least one of an intake cam phaser and an exhaust cam phaser; and
    calculating an output spark advance value based upon said principal spark advance value and data from the at least one engine sensor.

14. The method of claim 13 further comprising determining said actual rotational position of the at least one of an intake cam phaser and an exhaust cam phaser by analyzing information from at least one rotational position sensor on each of the at least one of an intake cam phaser and an exhaust cam phaser.

15. The method of claim 13 further comprising performing predictive calculations to determine said actual rotational position of the at least one of an intake cam phaser and an exhaust cam phaser.

16. The method of claim 13 further comprising modifying said principal spark advance with an output of a second look-up table that is indexed by said actual rotational position of the at least one of an intake cam phaser and an exhaust cam phaser.

17. The method of claim 16 further comprising scaling said output of said first look-up table by a first scalar, scaling said output of said second look-up table by a second scalar, and combining said scaled outputs to produce said principal spark advance value.

18. The method of claim 13 further comprising combining said principal spark advance value with at least one spark modifier.

* * * * *